FIGURE I
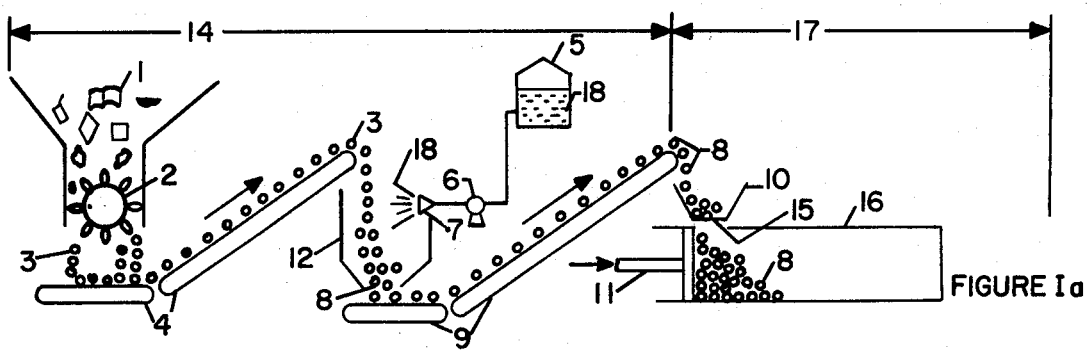
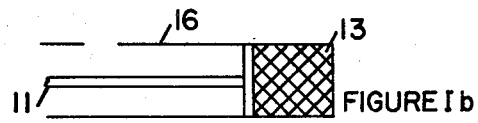
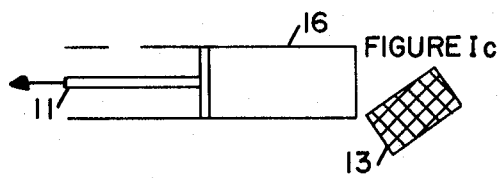
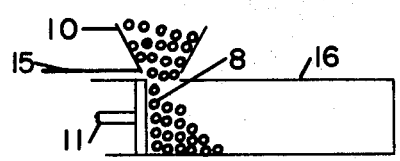

FIGURE II
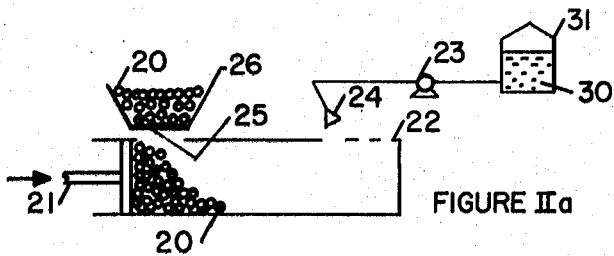
FIGURE IIa
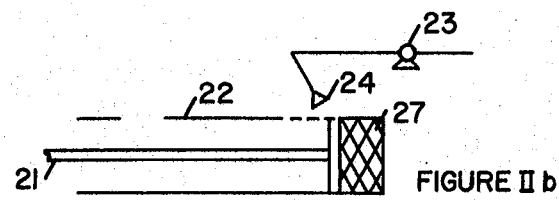
FIGURE IIb
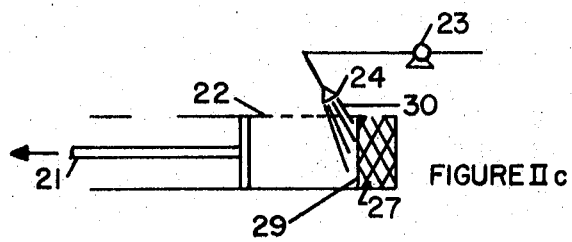
FIGURE IIc
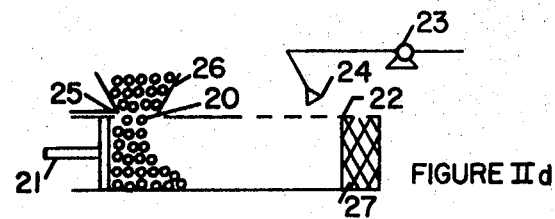
FIGURE IId
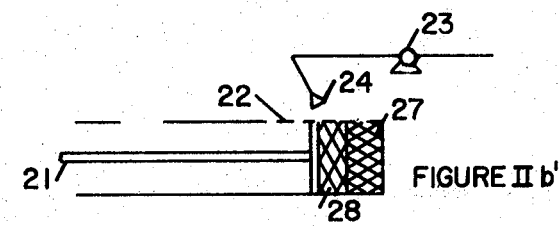
FIGURE IIb'
INVENTOR
ROBERT J. BATHGATE United States Patent Office 3,654,048
Patented Apr. 4, 1972

3,654,048
COMPACT BALE COMPRISING 1-15 PARTS BY WEIGHT BITUMEN AND 85-99 PARTS BY WEIGHT OF SHREDDED MUNICIPAL REFUSE
Robert J. Bathgate, Media, Pa., assignor to Sun Oil Company, Philadelphia, Pa.
Filed Apr. 13, 1970, Ser. No. 27,652
Int. Cl. B65f 5/00
U.S. Cl. 161—7   9 Claims

ABSTRACT OF THE DISCLOSURE

After municipal refuse is collected, it is shredded and compressed into a bale. The distribution throughout the shredded municipal refuse of an additive, prior to compression, substantially improves the physical properties of the compressed bale. The additive can be either a bitumen or bitumen containing a minor quantity of a petroleum naphthenic acid or a polyoxyethylene fatty alkyl-1,3-propanediamine, said additive having a paper peel strength of at least 0.4 pound per inch at 70° F.

BACKGROUND OF THE INVENTION

This invention relates to a method for treating municipal refuse. More specifically this invention relates to an improved method for treating municipal refuse after it has been shredded but before it has been formed into bales. This invention involves the distribution throughout the shredded refuse of an additive after which the treated refuse is compressed into a compact bale having superior physical properties. The additive, having certain properties, is either a bitumen or bitumen containing a minor quantity of petroleum naphthenic acid or polyoxyethylene fatty alkyl-1,3-propanediamine. The invention also relates to the compressed refuse bale containing the additive.

Municipal refuse is disposed of by outdoor burning, composting, incinerator burning, with and without a heat recovery system, and open dumps. More recently open dumps, because of air pollution and health problems, are being replaced by landfills. Landfill involves dumping the refuse on a site close to the municipality, driving a heavy construction machine, e.g. a bulldozer, over the refuse to compress the refuse and at the end of the day covering the compressed refuse with several feet of earth. A more recent concept of landfill involves the baling of refuse near the collection area and then transporting the compressed bales a long distance where they are dumped and covered with several feet of earth. A more detailed description is given in a recent report entitled "The Feasibility of Baling Municipal Refuse," Public Works Department, City of San Diego, Calif., April 1968.

The foregoing baling process comprises, after collection and transportation to the baling site, the application of pressure to the loose and wetted refuse within an enclosure and thereafter binding the resulting compacted mass with metal straps while it is in a confined condition. Thus the product is a compact bale. However, a major complication in using this baling process is that the collected refuse lacks homogeneity as to size and composition.

Composition of municipal refuse varies substantially depending upon the time of year and the location in the municipality in which it is collected. Thus, the composition of any given batch feed to the baler can differ markedly from another batch, thereby presenting operational problems for controlling the baler and causing the completed bales to vary widely in density. This variation in density creates problems for transporting the bales from the baling site to the landfill site. For example, the number of railroad cars required to transport a given weight of refuse is increased with lower density bales. Finally, a given landfill volume will hold less pounds of refuse when filled with lower density bales than with higher density bales.

A solution to the nonhomogeneity of the refuse, after transportation to the baling site, is to shred the refuse. The shredder breaks, cuts and tears the refuse into smaller pieces and some mixing occurs as a result. This cutting and tearing reduces considerably the nonhomogeneity. Shredding also has the advantage of creating material that can be easily moved by conveyor belts and facilitates compacting.

Before compression in the aforementioned baling process, large quantities of water are added to the shredded refuse. The addition of water results in a denser bale for a given baling pressure. The increase in bale density is greater than that accounted for by the weight of water added.

The large amount of water, as much as 50 weight percent of the total weight, in the refuse bale has an inherent disadvantage and creates problems. The disadvantage is that a large amount of water is being transported from the baling site to the landfill site. This additional weight detracts from the efficiency of the system. Another problem created by the water is that anaerobic decomposition is accelerated and thus the production rate of odor is increased. Still another problem with the aforementioned process is that the metal or plastic straps used to hold the bale together are expensive.

Consequently, an additive that can be added in a small quantity to the shredded refuse prior to compression which avoids the disadvantages of water and minimizes the need for costly straps is highly desired.

SUMMARY OF THE INVENTION

A small quantity of liquid bitumen or liquid bitumen containing a petroleum naphthenic acid or a polyoxyethylene fatty alkyl-1,3-propanediamine added to and distributed throghout shredded municipal refuse prior to compression, materially improves the properties of the resulting compressed bales. The use of this additive eliminates the need for the water added to the refuse before compression and their reduction in the amount of water in the bale reduces the rate of odor production during transit. The additive minimizes the need for costly strapping and keeps the shredded refuse around the edges of the bale from coming loose during transit. Furthermore, the additive, for a given compression force in a baler, allows the density of the compressed bale to be increased over that possible with just water as a binder. A satisufactory additive has a paper peel strength of at least 0.4 pound per inch at 70° F.

BRIEF DESCRIPTION OF THE DRAWING

FIGS. I and II are schematic illustrations of different methods that can be used when practicing this invention. FIG. I illustrates a method wherein the resulting compact bale is formed with one compression step. FIG. I comprises FIGS. Ia, Ib, Ic and Id which illustrate the method is sequential steps. FIG. II illustrates a method wherein the resulting compact bale is obtained by sequential compression steps. FIG. II comprises FIGS. IIa, IIb, IIb' and IId which illustrate the method in sequential steps.

DESCRIPTION

FIG. I illustrates one method that can be used when practicing this invention, in which method only one compression step is necessary to form the finished compact bale. In FIG. Ia collected refuse 1 is fed to a shredding device 2 which tears, cuts and chops the refuse into somewhat similar size pieces 3. Some mixing occurs in the shredding device 2 and this increases the tendency toward a uniform composition of the refuse. The shredded refuse 3 is transported, in this illustration by conveyor belt 4, to a spraying chamber 12. As the shredded refuse 3 falls through the chamber 12, liquid additive 18 is sprayed onto the refuse. In this chamber 12 a series of spray nozzles 7 are attached to the inner wall. The liquid additive 18 is stored in a suitable storage tank 5. This tank 5 is connected to a pump 6 which forces the additive from the tank 5 through the necessary piping to the spray nozzles 7. Sprayed shredded refuse 8 leaves the chamber 12. The refuse is collected and transported, in this illustration by conveyor belt 9, to container 10. The aforementioned sequence of steps, prior to baling, is labeled the preparation phase 14.

The baling phase 17, illustrated in FIG. I$a$, has only one compression step. The sprayed shredded refuse 8 is collected in a container 10. This container 10 has a trap door 15. In FIG. I$a$ the container has already emptied its contents into the baler 16 so that the trap door 15 is closed. The baler is filled with sprayed shredded refuse 8. The piston 11 is starting to compress the refuse 8. In FIG. I$b$ the priston 11 has completed its stroke and a compact bale 13 is formed. In FIG. I$c$ the piston 11 is returning to its starting position and the compact bale 13 is removed. In FIG. I$d$ the piston 11 is at rest and the trap door 15 of the container 10 is open. The collected sprayed shredded refuse 8 is falling into the baler 6. The operation in FIG. I$a$ is next and then the operations as shown in FIGS. I$b$ to I$d$ are repeated.

FIG. II illustrates the variation in the method wherein the compact refuse bale is formed in segments by sequential compressions. The preparation phase in this method, but not shown in FIG. II, is the same as the preparation phase 14 shown in FIG. I. In FIG. II the baling phase is different from that shown as the baling phase 17 in FIG. I.

In FIG. II$a$ the sprayed shredded refuse 20 is collected in container 26 with a trap door 25. The balers 22 is charged with a batch of sprayed shredded refuse 20. The piston 21 is starting its compression stroke. In FIG. II$b$ a batch has been compressed into a compact mass 27. In FIG. II the piston 11 is returning to its original position. However, after a batch is compressed and sometime before the next batch is compressed, one surface 29 of the compact mass 27 is coated with a liquid additive 30. In this illustration the additive is shown being sprayed onto the surface 29 via nozzle 24 which is fed by pump 23 which takes the liquid additive 30 from storage 31. In FIG. II$d$ the piston 21 has returned to its original position and the trap floor 25 of the container 26 is open. Sprayed shredded refuse drops into the baler 22. Then the operation shown in FIG. II$a$ is repeated. In FIG. II$b'$ the second batch of refuse 20 is compressed into a second compact mass 28 contacting the additive-coated surface of the compact mass 27 first formed in previous FIG. II$b$.

After the operation shown in FIG. II$b'$, the piston 21 returns to its starting position. The resulting bale, consisting of batches 27 and 28, can be removed from the baler as the finished product. Alternatively, after the operation shown in FIG. II$b'$, the operations shown in FIGS. II$a$ to II$d$ can be repeated as many times as necessary to obtain the desired size bale.

In either of the methods, as illustrated in FIGS. I and II, after the compressed bale has been formed, straps can be used to help hold it together. The number of straps used, however, will be substantially less than the number used when the bales are made without the additive defined herein.

Also, after the compact bale is formed as described in either FIGS. I or II, it can be coated externally with the additive. The external coating can be applied whether straps are used or not used. The coating can be applied via dipping and draining or spraying.

As already mentioned, the composition of municipal refuse varies substantially. Municipal refuse is almost anything that people no longer want to keep. However, as defined herein, it does not include wastes resulting from human and/or animal metabolism. Municipal refuse refers to the generally solid wastes of the consuming public. This refuse contains cellulosic material such as paper, cardboard and wood; yard trimmings such as grass clippings; rag, rubber, plastics; garbage which refers to discards created during the preparation of food and/or uneaten food; metal such as cans; glass and ashes. As the foregoing listing indicates, one characteristic of municipal refuse is its nonuniform composition. This distinguishes municipal refuse from commercial waste. One characteristic of commercial waste is its relatively uniform composition; the waste paper from an office building or the garbage from a restaurant.

Another characteristic of municipal refuse is that its composition varies from community to community and even within a community. This variation depends in part upon the economic level of the people living in that community. Thus, the refuse from a community comprising people with a lower income level contains much more garbage than the refuse from a community comprising people with a higher income level. Another characteristic of municipal refuse is that the composition varies according to the season. Thus, during the Christmas season the amount of cellulosic material can be extremely high compared to the rest of the year. Also, shortly after Christmas, the refuse contains spruce, fir and pine trees, which are not normally present in the refuse.

According to a recent report an "average municipal refuse" has the composition shown in Table I.

TABLE I.—COMPOSITION OF MUNICIPAL REFUSE [a]

| Rubbish | Weight percent, as received | Moisture content, as received |
|---|---|---|
| Paper mixed | 42.0 | 10.2 |
| Wood and bark | 2.4 | 20 |
| Grass | 4.0 | 65 |
| Brush | 1.5 | 40 |
| Greens | 1.5 | 62 |
| Leaves | 5.0 | 50 |
| Leather | 0.3 | 10 |
| Rubber | 0.6 | 1.2 |
| Plastics | 0.7 | 2 |
| Oils and paints | 0.8 | 0 |
| Linoleum | 0.1 | 2.1 |
| Rags | 0.6 | 10 |
| Street sweeping | 3.0 | 20 |
| Household dirt | 1.0 | 4 |
| Food wastes: | | |
| Garbage | 10.0 | 72 |
| Fats | 2.0 | 0 |
| Noncombustible: | | |
| Metallic | 8.0 | 3 |
| Glass and ceramics | 6.0 | 2 |
| Ashes | 10.0 | 10 |
| Total | 100.0 | |
| Composite refuse as received | | 20.7 |

[a] Proceedings, 1964 National Incinerator Conference, ASME, N.Y., March 18–20, 1964, "Refuse Composition and Flue Gas Analyses from Municipal Incinerators," E. R. Kaiser.

Yet refuse from another community can substantially differ from this "average." For example, San Diego refuse, reported in the aforementioned San Diego report, contains no ashes compared to the 10 weight percent reported for the "average." Furthermore, the San Diego refuse contains only 0.8 weight percent garbage compared to the 10.0 weight percent reported for the "average."

In view of the foregoing, it can be seen that the composition of municipal refuse varies significantly. However, it is preferable that the municipal refuse treated by this invention contain between from 10 to 90 weight percent of cellulosic matter. It can be even more preferable if the refuse contains at least 0.25 weight percent metal.

As can be seen from Table I, the moisture content of this one sample of received municipal refuse is 20.7 weight percent. However, the moisture content of the individual items of the refuse ranges from 0 to 72 weight percent. Furthermore, as this refuse is exposed to the weather, the moisture content can vary substantially. When raining, the moisture content becomes extremely high; whereas during a prolonged dry spell, it becomes rather low. In addition a processing step affects the moisture content. The shredding step, because of the friction involved in the tearing and cutting of the refuse, generates a significant amount of heat which in turn evaporates moisture in the refuse. Because of the disadvantages inherent in having refuse containing a large percent of moisture, it is desirable that the moisture content of the refuse be low.

Asphalt is defined by the American Society for Testing Materials as a "dark brown to black cementitious material, solid or semisolid in consistency, in which the predominating constituents are bitumens which occur in nature as such or are obtained as residue in refining petroleum." In addition, asphalts characteristically contain a bitumen fraction insoluble in paraffin naphtha. This fraction is called the asphaltenes. The solid or semisolid residues from refining operations are usually called "cracked asphalt," "petroleum pitch," "thermal pitch" or "cracking-coil pitch."

Petroleum asphalts are derived principally from four types of processes. They are straight run asphalts, obtained by atmospheric, steam or vacuum distillation of lower boiling components of the oil; asphalts produced as the bottoms product from a combined distillation process; asphalts separated by solvent extraction, e.g. the propane deasphalting process, and air blow and chemically treated asphalts.

The term "bitumens" is a more generic term than asphalt and, according to the American Society for Testing Materials, relates to "Mixtures of hydrocarbons of natural or pyrogenous origin; or combinations of both, frequently accompanied by their nonmetallic derivatives which may be gaseous, liquid, semisolid or solid, and which are completely soluble in carbon disulfides." In usual commercial practice the term "bitumens" is restricted to the semisolid or solid bitumens which include asphalts and tars and pitches. The latter two are derived from stocks obtained by destructive heat action on crude oil fractions, coals or other organic raw materials. In this specification the term "bitumens" or the like will be restricted to the usual commercial definition.

In this specification the term "additive" means either a bitumen or a bitumen containing a minor quantity of a petroleum naphthenic acid or a polyoxyethylene fatty alkyl-1,3-propanediamine. The function of these two materials is explained hereinafter.

The maximum amount of additive that should be added to the refuse before compression is about 15 parts by weight of additive per 85 parts by weight of refuse. When more than 15 parts by weight of additive is distributed throughout the refuse, the additive will ooze out of the refuse as it is being compressed and adhere to and accumulate on the baling equipment. This causes problems regarding the operation of the baler itself and is wasteful of the additive. On the other hand if an extremely small quantity of additive, e.g. less than one weight percent, is used, the resulting bale lacks the desired physical strength. Thus the preferred range of the amount of additive used is between 1 and 15 parts by weight per 85 to 99 parts by weight of refuse.

When the compact bale is formed with one compression, as shown in FIG. 1, and is subsequently externally coated with 0.1 to 2.0 parts by weight of liquid additive per 100 parts by weight of compact bale (not illustrated), the amount of additive previously incorporated in the shredded refuse prior to compression can be reduced from 1 to 15 parts by weight of 1 to 10 parts by weight.

When, as shown in FIG. II, the compact bale is formed by sequentially compressing batches of additive and refuse against each other, the amount of additive incorporated in the shredded refuse prior to compression can be reduced from 1 to 15 parts by weight to 1 to 12 parts by weight. However, this sequential compressing batch technique requires that 0.05 to 0.50 part by weight of liquid additive per 99.95–99.5 parts by weight of the compressed batch be applied to the surface of each compressed batch against which the next succeeding batch will be compressed against.

When the compact bale is formed by sequentially compressing batches of additive and refuse against each other with the additive being applied to a surface of each compressed batch and the resulting bale being coated externally, the amount of additive incorporated in the shredded refuse prior to compression can be reduced from 1 to 12 parts by weight to 1 to 10 parts by weight. This sequential compressing batch technique still requires that 0.05 to 0.50 part by weight of liquid additive per 99.95–99.5 parts by weight of the compressed batch be applied to the surface of each compressed batch against which the next succeeding batch will be compressed against. The amount of coating externally applied ranges from 0.1 to 2.0 parts by weight of additive per 100 parts by weight of compact bale.

Not all bitumens have sufficient strength to be satisfactory for use in baling municipal refuse. As discussed herein, a major component of municipal refuse is cellulosic material. Thus any bitumen that is used in this invention must have strength to hold cellulosic matter such as paper together. The strength must be such that it can resist the force of water which when being absorbed by cellulosic matter forces the cellulosic matter apart. The actual determination of these forces is described hereinafter. When the bitumen has a paper peel strength of at least 0.4 pound per inch at 70° F., it has sufficient strength to resist the force exerted by water being absorbed by cellulosic material. The test procedure used to determine paper peel strength is a modified T-Peel Test or Peel Resistance of Adhesions (ASTM D1876–61T) and the modifications are described hereinafter.

Paper peel strengths are influence by temperature. Thus if the temperature decreases, the paper peel strength of a bitumen increases until a temperature is reached wherein the bitumen is too brittle and paper peel strength decreases. Also, if the temperature increases, the paper peel strength of a bitumen decreases until the bitumen becomes a liquid and there is no measurable strength. The temperature within a compact compressed bale can vary appreciably depending on ambient temperature and biological activity within the bale. Ambient temperatures vary appreciably throughout the United States. Thus, for example, highest temperature on record for large United States cities is 115° F. and the lowest temperature on record for large United States cities is −44° F. When no biological activity exists within the bale, the temperature within the bale approaches ambient temperature.

Normally, once the bale is compressed, the environment within the bale is essentially without free oxygen. Sufficient anaerobic microbiological activity within the bale will generate heat. This heat is sufficient to raise the temperature within the bale to 20 to 30° F. above the ambient temperature as long as the ambient temperature is not substantially below 32° F. for extended periods. Thus the temperature within the bale in which there is anaerobic activity can range from about 40 to 140° F. If sufficient free oxygen exists within the bale, earobic microbiological activity occurs and the resulting temperature could be as high as about 160° F.

As the foregoing discussions indicate, the temperature within a compact bale could be as low as −44° F. to as high as 150 to 160° F. depending on ambient temperature, which in turn depends on geographical location, season and/or microbiological activity within the bale. Since the object of the additive added to the shredded refuse is to hold the bale together, the additive must have at least a paper peel strength of 0.4 pound per inch at 70° F. for the cooler ambient temperatures. However, for warmer ambient temperatures, a preferred paper peel strength would be at least 2.0 pounds per inch at 70 F.

Municipal refuse also contains metal which has a nonporous surface of substantially different adhesive properties than cellulosic matter. The strength of a bale will be improved when metal is present in large amounts in municipal refuse if the bitumen contains a small quantity of petroleum naphthenic acid or a polyoxyethylene fatty alkyl-1,3-propanediamine. However, if too much petroleum naphthenic acid or a polyoxyethylene fatty alkyl-1,3-propanediamine is present in the bitumen, the bitumen will not have a sufficient paper peel strength to be a satisfactory municipal refuse additive. Thus bitumen containing between from 0.25 to 4.0 weight percent of petroleum naphthenic acid or a polyoxyethylene fatty alkyl-1,3-propanediamine is preferred. A preferred petroleum naphthenic acid is a naphthenic acid extracted from a heavy lubricating oil. A process for preparing these acids is described in U.S. Patent No. 2,770,580 issued Nov. 13, 1956 to E. M. Honeycutt et al. The naphthenic acids can be ones naturally occurring in the bitumen or ones added to the bitumen. Petroleum naphthenic acids are discussed in detail in Kirk-Othmer, Encyclopedia of Chemical Technology, 2nd edition, vol. 13. Polyoxyethylene fatty alkyl-1,3-propanediamine is defined in Kirk-Othmer, Encyclopedia of Chemical Technology, 2nd edition, vol. 19, "Surfactants," page 559.

Thus in practicing this invention a liquid bitumen is distributed throughout shredded municipal refuse. The amount of bitumen is from 1 to 15 parts by weight per 85 to 99 parts by weight of said refuse. The bitumen used herein has a paper peel strength at least 0.4 pound per inch at 70° F. A preferred bitumen is petroleum asphalt. Other preferred bitumens are ones containing 0.25 to 4.0 weight percent of a petroleum naphthenic acid or a polyoxyethylene fatty alkyl-1,3-propanediamine. The resulting mixture of bitumen and refuse is compressed into a compact bale. When the compact bale is externally coated with 0.1 to 2.0 parts by weight of liquid bitumen per 100 parts by weight of compact bale, the maximum amount of bitumen distributed through the shredded refuse prior to compression can be reduced 15 parts to 10 parts by weight of refuse. Strapping optionally can also be used to assist in holding the bale together.

When the resulting bale is formed in segments by sequentially compressing batches of mixtures of bitumen and refuse against each other, the amount of liquid bitumen distributed throughout the shredded municipal refuse prior to compression can range from 1 to 12 parts by weight. In addition 0.05 to 0.5 part by weight of bitumen per 99.95 to 99.5 parts by weight of compressed batch is applied to the surface of each compressed batch against which the next succeeding batch is compressed. When the compact bale is formed by this sequentially compressing of batches and the resulting bale is externally coated with 0.1 to 2.0 parts by weight of liquid bitumen per 100 parts by weight of compact bale, the amount of liquid bitumen distributed throughout the refuse prior to compression is 1 to 10 parts by weight of bitumen rather than the foregoing 1 to 12 parts. Strapping can also be used to assist holding the bale together.

The following illustrate the improvements that are accomplished by the present invention.

BITUMENS INCREASE BALE DENSITY

Compact bales of refuse were formed via the method illustrated in FIG. 1 with various amounts of bitumen. The resulting bale densities are shown in the following Table II. Similarly, a compact bale of refuse was formed via the method illustrated in FIG. I using water as an additive. These resulting bale densities are also shown in Table II. Comparison of the densities of the bales containing bitumen with the densities of the bales containing water indicates that the bales containing bitumens have the highest densities. The increase in density of the bales formed with a bitumen is greater than just the weight of the bitumen added to the refuse. Higher bale densities signify that a given landfill volume site can hold more pounds of refuse than when filled with lower density bales.

TABLE II.—DENSITIES OF COMPRESSED BALES*

| Additive | Moisture content of refuse, wt. percent | Bale densities, lbs./ft.³, Amount of additive, wt. percent | | |
|---|---|---|---|---|
| | | 0 | 2 | 23 |
| Water | 5 | 37 | | 41 |
| Bitumen: | | | | |
| #1 | 13 | 50 | 59 | |
| #2 | 13 | 50 | 60 | |

*Baling pressure 2,500 p.s.i.

Inspections of the additive used in forming the bales herein are as follows:

| Additive | Viscosity, at 210° F. | Softening point, ° F. |
|---|---|---|
| Bitumen: | | |
| #1 | 185 | |
| #2 | 752 | 105 |
| #3 | 1,230 | 119 |
| #4 | 846 | 113 |
| #5 | 1,493 | 128 |
| #6 | | 121 |
| #7 | 5,184 | 139 |
| #8 | 759 | 117 |
| #9* | 1,319 | 124 |

*Bitumens 8 and 9 are heavy naphthenic acids.

BITUMENS INCREASE BALE STRENGTH

Several compact bales were formed via the method illustrated in FIG. 1 to demonstrate that the addition of a small amount of bitumen added to the shredded refuse prior to compression causes a substantial increase in bale strength compared to water. For comparative purposes, a bale was also formed which had as an additive #6 Fuel Oil having a viscosity of 140 SFS at 122° F. The resulting bale strengths are shown in the following Table III along with baling pressures. As shown in Table III, a bale containing 5 weight percent of bitumen #2 had a compressive yield strength and modulus of elasticity superior to a bale containing no additive. Also, as shown, a bale containing 5 weight percent of bitumen #1 had physical properties superior to bales containing no additive or #6 Fuel Oil.

TABLE III.—STRENGTH OF COMPRESSED BALES*

| Additive | Weight percent | Baling pressure, p.s.i. | Compressive yield stretch, p.s.i. | Modulus of elasticity, p.s.i. |
|---|---|---|---|---|
| None | | 1,500 | 18 | 470 |
| Bitumen #2 | 5 | 1,500 | 24 | 500 |
| None | | 2,500 | 27 | 820 |
| #6 fuel oil | 5 | 2,500 | 18 | 400 |
| Bitumen #1 | 5 | 2,500 | 33 | 960 |

*Refuse contained 13 weight percent water.

BITUMEN CHARACTERIZATION

To indicate what bitumens are suitable for incorporation into shredded refuse, a modification of the T-Peel Test was used. The T-Peel Test or Peel Resistance of Adhesives (ASTM D1876–61T) is primarily intended for determining the relative peel resistance of adhesive bonds between flexible adherents by means of a T-type specimen. The modifications were as follows:

(1) A 3-inch by 7-inch panel was prepared and a 1-inch by 7-inch specimen was cut therefrom rather than preparing a 6-inch by 12-inch panel and cutting the latter into test specimens as recommended in the test procedure;

(2) The bond separation rate was 0.1 inch per minute rather than the recommended 5.0 inch per minute;

(3) The test was conducted at ambient temperature and ambient relative humidity rather than the specfied conditions;

(4) Conditioning of test samples was for a minimum of 16 hours rather than the recommended 7 days;

(5) In the calculation of peel strength, the maximum peak, shown in the autographic curve, was used rather than the first 5 inches of peeling after the initial peak.

The bond separation rate used in the modified peel strength test was determined in the following manner. A bale without any additive was prepared and longitudinally immersed in water. The bale was immersed about half way. At various times the length of one edge immersed in the water was measured. The changes in the length of the edge at a certain time and the bond separation rate were as follows:

| Time of immersion minutes | Amount of expansion, inches | Bond separation rate, inches/min. |
|---|---|---|
| 0–10 | 2.7 | 0.135 |
| 10–20 | 1.6 | 0.080 |
| 20–30 | 0.8 | 0.040 |

Thus initially the bale expanded 2.7 inches in 10 minutes for an average expansion of 0.27 inch per minute and a bond separation rate of 0.135 inch per minute. To obtain bond separation rate, the expansion rate is divided by two. Thus in determining the peel strength of a bitumen, the machine used in the T-Peel Test applied sufficient force to pull the specimen apart at the rate of 0.10 inch per minute. This 0.10 inch per minute approximated the average bond separation rate for the first 20 minutes. The force necessary to pull the paper apart at this rate is a measure of the strength of the adhesive. This force is reported as peel strength; its units are pounds per inch. Numerous different bitumens were tested in this fashion. The results are shown in the following Table IV. Peel strengths of 0.41 to 3.02 pounds per inch were observed. The specimens used were made from dry kraft paper.

TABLE IV.—PEEL STRENGTH OF BITUMENS

| Bitumen number: | Paper peel strength, lbs./inch |
|---|---|
| 2 | 0.41 |
| 3 | 0.46 |
| 4 | 0.42 |
| 5 | 2.78 |
| 6 | 1.19 |
| 7 | 2.91 |
| 8 [a] | 2.25 |
| 9 [a] | --- |
| 10 (Bitumen #7 + 0.5 wt. percent Bitumen #8) | 2.98 |
| 11 (Bitumen #7 + 2.0 wt. percent Bitumen #8) | 3.02 |
| 12 (Bitumen #5 + 0.5 wt. percent Bitumen #9) | 2.92 |
| 13 (Bitumen #5 + 2.0 wt. percent Bitumen #9) | 2.20 |

[a] Petroleum naphthenic acid.

All of these bitumens are satisfactory additives for use in this invention. The presence of 50 weight percent moisture in the paper substrate before binder application has no significant influence on the strength of the material examined.

The strength of certain of the aforementioned bitumens was determined on dry brass strips. The reason for this is that nonporous metal surfaces have binding properties different from those of the porous kraft paper used in the T-Peel Test. Furthermore, metals can make up a large percentage of municipal refuse. The procedure used here was the same as described for dry kraft paper. The results in the following Table V indicate that a bitumen containing naphthenic acid or a polyoxyethylene fatty alkyl-1,3-propanediamine is a better binder for dry nonporous metal surfaces than the same bitumen without said acid or a diamine.

TABLE V.—ADVANTAGE OF USING ACID [1] OR DIAMINE [2] IN BITUMEN

| Additive: | Peel strength, lbs./inches |
|---|---|
| Bitumen #7 | 2.98 |
| Bitumen #7 plus 0.5 wt. percent of Bitumen #9 [1] | 3.62 |
| Bitumen #7 plus 2.0 wt. percent of Bitumen #9 [1] | 3.08 |
| Bitumen #7 plus 0.5 of diamine [2] | 3.33 |

[1] Petroleum naphthenic acid.
[2] Diamine used had the following formula
$RNHCH_2CH_2CH_2N(CH_2CH_2OH)_2$
wherein R is a tallow.

Testing conditions were as follows: bond separation rate, 0.1 in./min.; binder-film thickness, 5 mils; brass shim thickness, 3 to 4 mils; testing temperature 73 to 77° F.; cohesion type of break.

The invention claimed is:
1. A compact bale comprising 1 to 15 parts by weight of bitumen to 85 to 99 parts by weight of shredded municipal refuse, said bitumen being distributed throughout said refuse and having a paper peel strength of at least 0.4 pound per inch at 70° F.
2. A compact bale according to claim 1 wherein the compact bale has an external coating of 0.1 to 2.0 parts by weight of bitumen per 100 parts by weight of compact bale.
3. A compact bale according to claim 1 comprising adhering segments of said refuse said bitumen distributed throughout each segment and wherein the segments are held together by 0.05 to 0.5 part by weight of bitumen per 99.95 to 99.5 parts by weight of a segment.
4. A compact bale according to claim 3 wherein said compact bale has an external coating of 0.1 to 2.0 parts by weight of bitumen per 100 parts by weight of compact bale.
5. A compact bale according to claim 1 wherein the bitumen is a petroleum asphalt.
6. A compact bale according to claim 1 wherein the shredded municipal refuse comprises from 10 to 90 weight percent of cellulosic matter.
7. A compact bale according to claim 1 wherein the shredded municipal refuse comprises from 10 to 90 weight percent of cellulosic matter and at least 0.25 weight percent of metal.
8. A compact bale according to claim 7 wherein the bitumen contains 0.25 to 4.0 weight percent of petroleum naphthenic acid.
9. A compact bale according to claim 7 wherein the bitumen contains 0.25 to 4.0 weight percent of polyoxyethylene fatty alkyl-1,3-propane diamine.

References Cited

UNITED STATES PATENTS

| | | | |
|---|---|---|---|
| 3,330,088 | 7/1967 | Dunlea | 53—24 |
| 3,383,228 | 5/1968 | Rekate et al. | 264—330 X |
| 2,347,697 | 5/1944 | Levey | 106—282 X |
| 3,088,836 | 5/1963 | Garti et al. | 106—282 X |
| 3,281,256 | 10/1966 | Rogers et al. | 264—330 X |
| 3,418,402 | 12/1968 | Grissom et al. | 106—282 X |
| 3,432,322 | 3/1969 | Rogers | 106—281 |
| 3,195,447 | 7/1965 | Taylor | 100—74 |
| 3,426,673 | 2/1969 | Miner et al. | 100—39 X |
| 3,451,185 | 6/1969 | Tezuka | 206—83.5 X |
| 3,514,921 | 6/1970 | Tezuka | 53—124 D X |

JOHN T. GOOLKASIAN, Primary Examiner

J. C. GIL, Assistant Examiner

U.S. Cl. X.R.

53—21 R, 24, 124 R, 123 D; 100—39, 73, 97; 106—202; 206—83.5; 264—330